Sept. 28, 1937. A. BARNSTEINER 2,094,340
RANGE
Filed Nov. 8, 1934 5 Sheets-Sheet 1

WITNESSES:
E. E. Juding
P. J. Fitzgerald

INVENTOR
Alfons Barnsteiner.
BY
N. M. Biebel
ATTORNEY

Sept. 28, 1937.  A. BARNSTEINER  2,094,340
RANGE
Filed Nov. 8, 1934  5 Sheets-Sheet 2
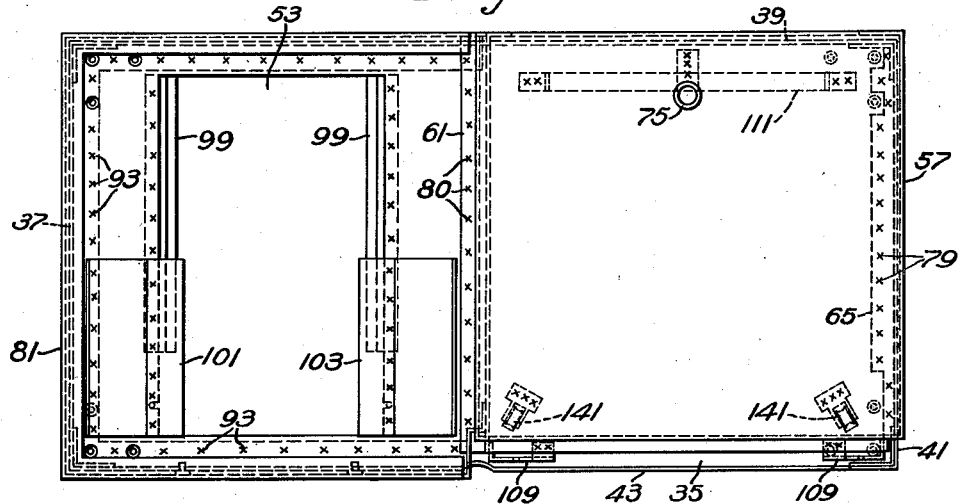
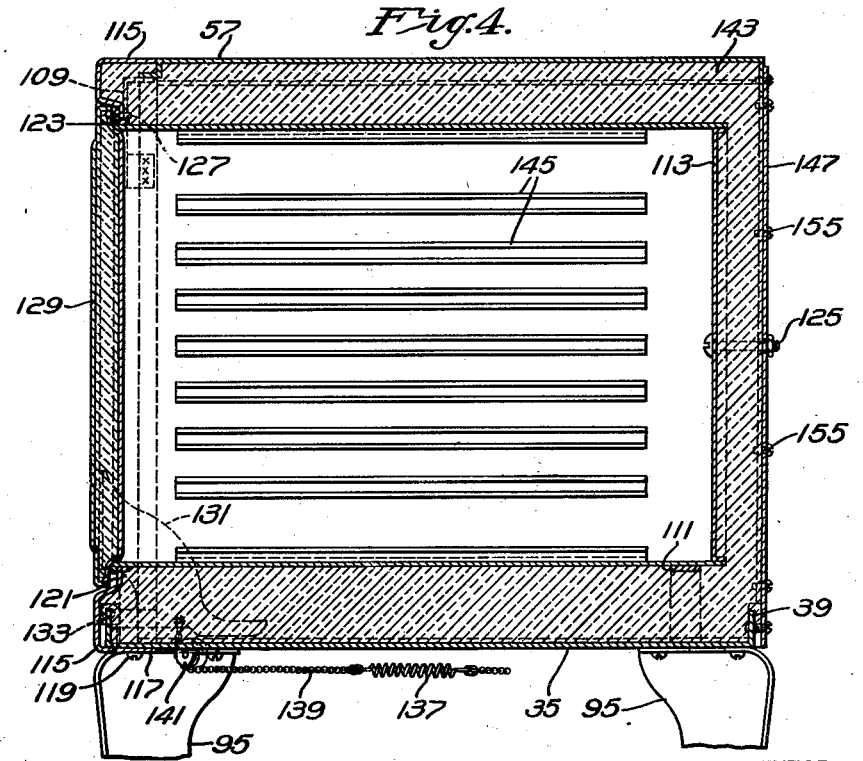
WITNESSES:
INVENTOR
Alfons Barnsteiner.
BY
ATTORNEY

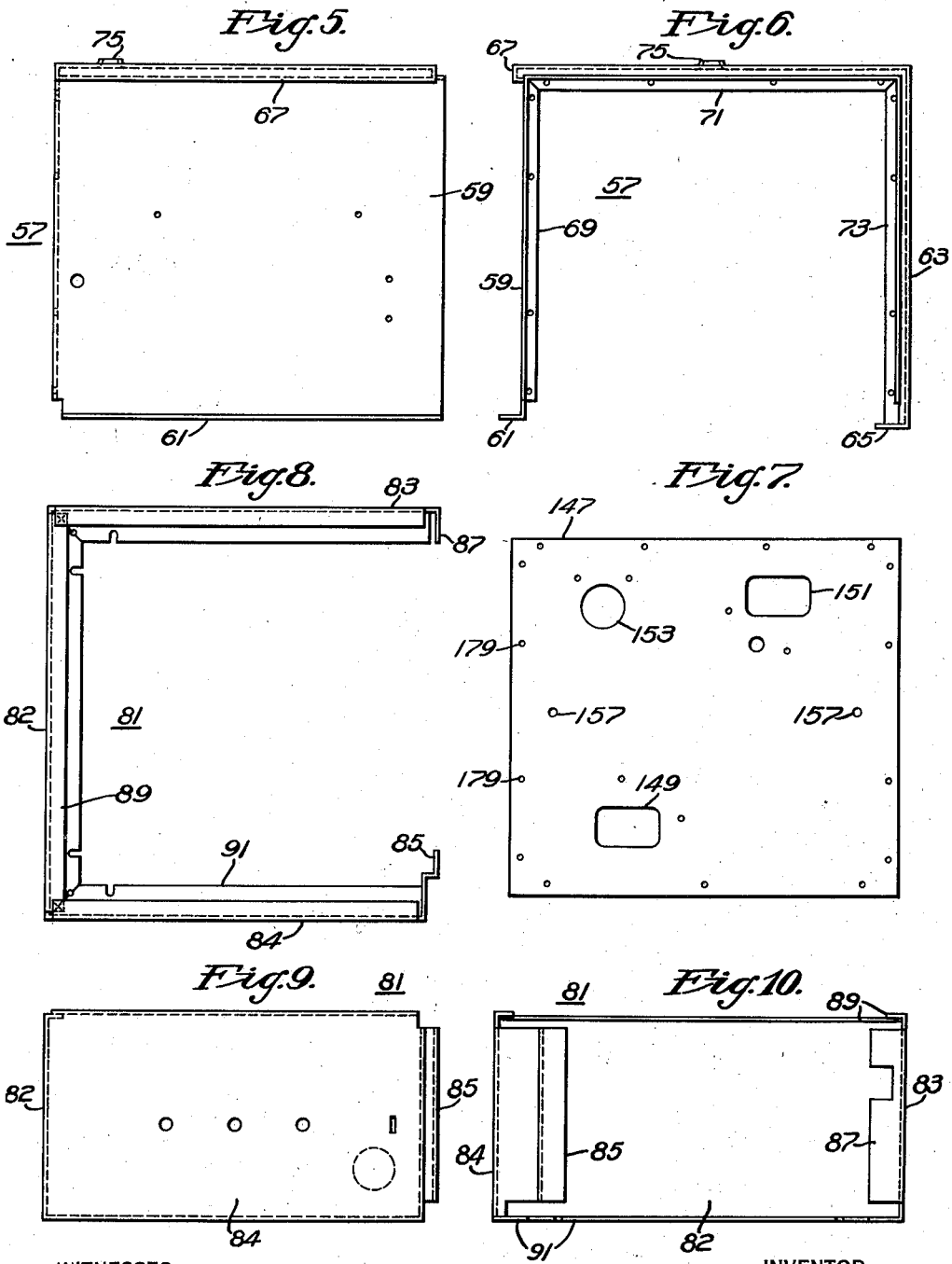

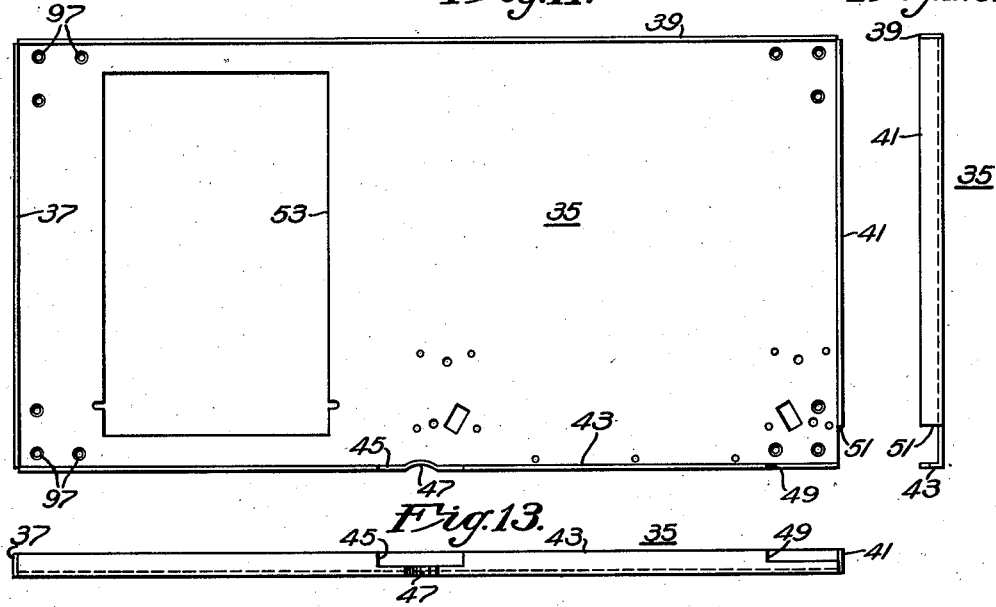
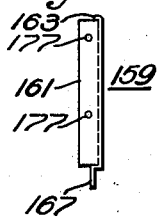
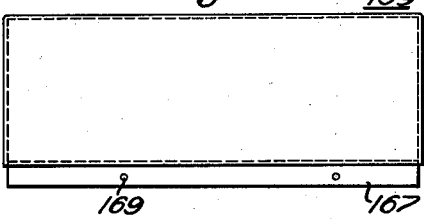
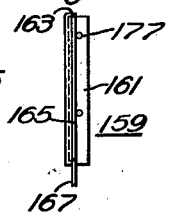
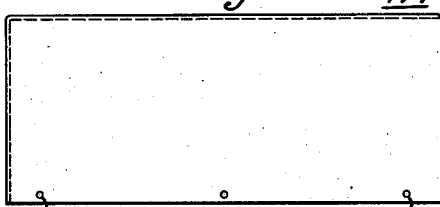
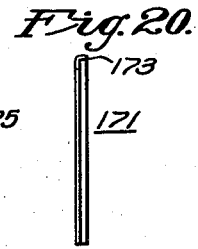

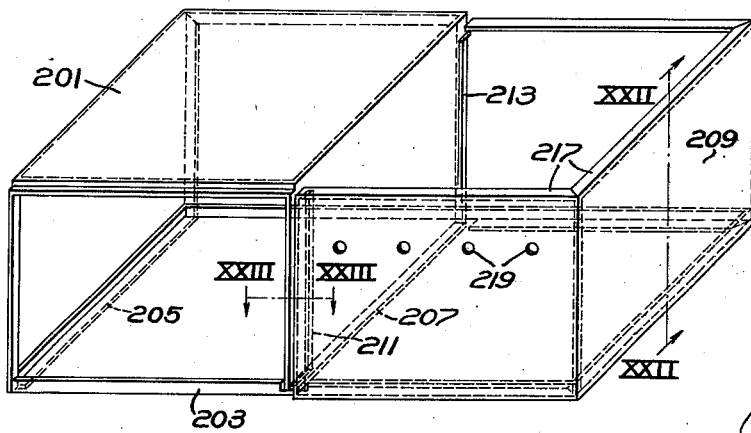
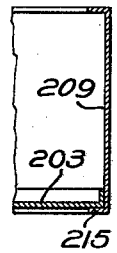
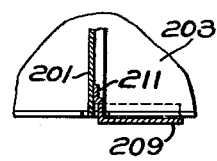
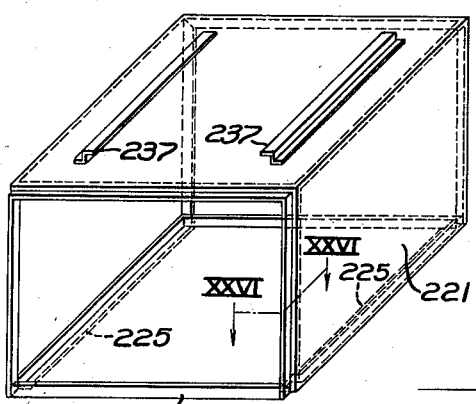
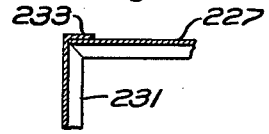
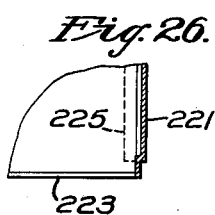

Patented Sept. 28, 1937

2,094,340

UNITED STATES PATENT OFFICE 2,094,340

RANGE

Alfons Barnsteiner, Mansfield, Ohio, assignor to Westinghouse Electric & Manufacturing Company, East Pittsburgh, Pa., a corporation of Pennsylvania Application November 8, 1934, Serial No. 752,063

4 Claims. (Cl. 126—39)

My invention relates to electric cooking appliances and, particularly, to range constructions.

An object of my invention is to provide a relatively simple and highly efficient range assembly.

Another object of my invention is to provide a range assembly comprising a minimum number of parts.

Another object of my invention is to provide a range construction which shall have a minimum weight and which shall, at the same time, be relatively rigid and strong.

Another object of my invention is to provide an electric range assembly that shall consist entirely of sheet metal portions, so arranged and secured to each other as to obviate the necessity for a relatively heavy supporting structure.

Another object of my invention is to provide a relatively simple construction for the stove portion of a range that shall embody crumb-deflecting plates beneath the heater elements.

Another object of my invention is to provide a construction for an electric range that shall obviate the use of substantially all finish strips in the assembly thereof.

Other objects of my invention will either be apparent from the following description of several forms of devices embodying my invention, or will be specifically pointed out hereinafter.

In practicing my invention, I provide a base or bottom pan, of sheet metal, an oven casing also of sheet metal, and of substantially inverted U-shape, supported on the base pan, and an incomplete stove casing located on and supported by the base pan or on the oven casing. The ends of the side walls of the stove casing are bent laterally to provide flanges whereby the stove casing may be secured to one side wall of the oven casing, the planes of the oven casing and of the stove casing being located at right angles to each other. The oven casing is provided with an in-turned flange at one end of a side portion thereof, which flange is located below the base pan and suitably secured thereto, while the end of the other side portion is provided with an out-turned flange by means of which it may be suitably secured against the upper surface of the base pan at an intermediate portion thereof.

A portion of the base pan is punched out to provide an opening beneath the stove heating elements, and a crumb tray is slidably mounted below the base pan, and crumb-deflecting plates, extending angularly upwardly away from the opening, are provided, located beneath certain of the heating elements.

The oven casing is provided with a back plate, as well as with a front door frame, and a pivotally mounted door fitting into the frame. A pair of holding brackets are mounted in the upper two corners of the oven casing, to have the upper corners of the door frame bolted thereagainst, the construction of the door frame being such that its lower portion fits below the front edge of the base pan. An oven lining is spaced from the oven casing, being supported by a bracket at the rear end thereof and by the door frame at the front end thereof.

An oven splasher plate extends from a bead at the top of the oven casing, which overhangs the stove part down to the stove casing, and a back splasher plate is located at the rear end of the stove casing, both splasher plates having portions extending back of the inner edge portion of the oven casing against which they may be secured. The stove casing is provided with an upper stove plate having a plurality of openings therein for receiving electric heating elements in the manner well known in the art. I may also provide a thermal control device for the heating element of the oven and suitable control means for the stove heating elements.

In the accompanying drawings:

Fig. 3 is a top plan view of the structure shown in Fig. 2;

Fig. 4 is a view in vertical lateral section, taken on the line IV—IV of Fig. 1;

Fig. 5 is a view in side elevation of an oven casing;

Fig. 6 is a view in front elevation of an oven casing;

Fig. 7 is a view in front elevation of a back closure plate for the oven casing;

Fig. 8 is a top plan view of a stove casing;

Fig. 9 is a view in front elevation of a stove casing;

Fig. 10 is a view in end elevation of a stove casing;

Fig. 11 is a top plan view of a base pan supporting the oven and the stove casings;

Fig. 12 is a view, in right-hand end elevation thereof;

Fig. 13 is a view in front elevation thereof;

Fig. 14 is a view in front elevation of an oven splasher plate;

Fig. 15 is a left-hand end view thereof;

Fig. 16 is a top edge view thereof;

Fig. 17 is a right-hand end view thereof;

Fig. 18 is a view in front elevation of a back splasher plate;

Fig. 19 is a top edge view thereof;

Fig. 20 is a right-hand end view of the back splasher plate,

Fig. 21 is a perspective view of a modified range assembly embodying my invention, Fig. 22 is a fragmentary vertical sectional view taken on the line XXII—XXII of Fig. 21, Fig. 23 is a fragmentary horizontal sectional view taken on the line XXIII—XXIII of Fig. 21, Fig. 24 is a view, in perspective, of another modification of device embodying my invention, Fig. 25 is a fragmentary horizontal sectional view taken on the line XXV—XXV of Fig. 24, and Fig. 26 is a fragmentary view in horizontal section, taken on the line XXVI—XXVI of Fig. 24.

Figure 1:
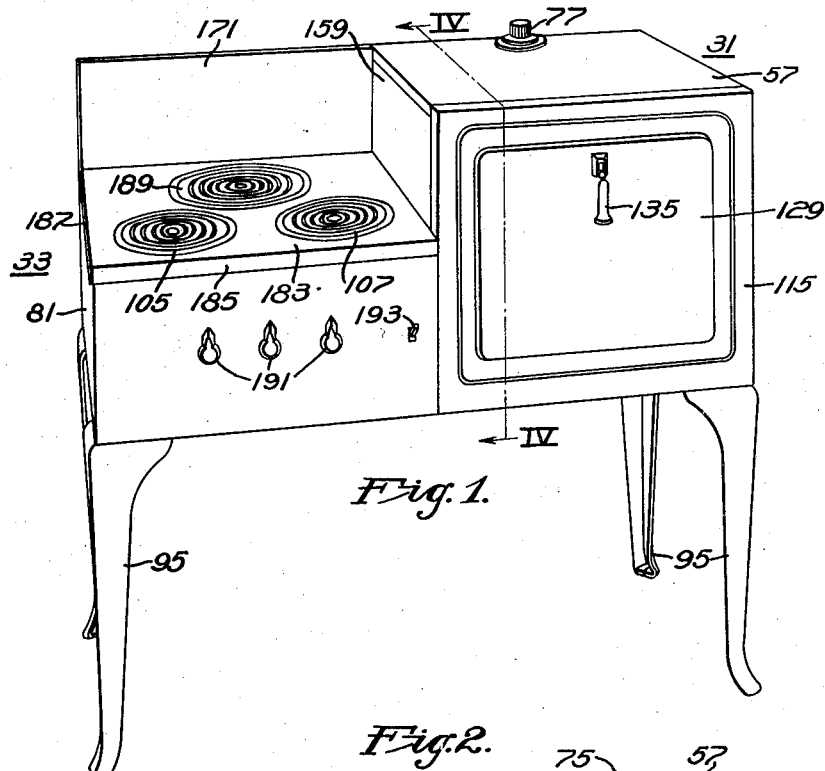
Figure 1 is a perspective view of one form of range embodying my invention.

Fig. 1 of the drawings shows a perspective view of one form of an electric range embodying my invention, and I have shown the same as comprising an oven assembly 31 and a stove assembly 33, in which the oven assembly is located at the right-hand end or side thereof, although it is within the purview of my invention to reverse the position of the two units and locate the oven at the left-hand side or end of the range.

The range includes also a base pan 35, which is shown in detail in Figs. 11, 12 and 13, from which it will be seen that the base pan is of substantially rectangular shape, and is made preferably of sheet metal, having up-turned flanges, the left-hand end flange being designated by the numeral 37, the rear flange being designated by numeral 39, the right-hand end flange by numeral 41, and the front flange by numeral 43. The central or intermediate portion of flange 43 is provided with a recess 45, as is shown more particularly in Fig. 13 of the drawings, and a portion of the flange below this recess is bent inwardly, as is indicated by the numeral 47 in Fig. 11 of the drawings. A right-hand end portion of flange 43 is cut out, as shown at 49 in Fig. 13 of the drawings, and a portion of flange 41 is also cut out at the forward end thereof, as is indicated at 51 in Fig. 12 of the drawings, in order to permit of easy and quick assembly and to permit of interfitting of certain portions of the cooperating members of the range. The base pan 35 is provided with a cut-out portion 53 beneath which a crumb tray, or dirt tray, 55 (see Fig. 2 of the drawings) is adapted to be located in a manner to be hereinafter described.

An oven casing 57 is shown in front elevation in Fig. 6 of the drawings, from which it will be noted that the casing has three sides only, which are integral or unitary with each other, and that it has an open bottom and open front and rear portions. The left-hand side 59 is provided with an out-turned flange 61 at its lower end, while the right-hand side 63 is provided with an in-turned flange 65, at its lower end portion, for purposes to be hereinafter set forth. The upper end of side 59 is provided with an overhanging bead 67, for a purpose to be hereinafter referred to, and oven casing 57 is provided also with rear in-turned flange portions 69, 71 and 73, which are perforated, as shown in Fig. 6 of the drawings, to permit of securing-screws or bolts extending therethrough, for a purpose to be referred to hereinafter. The upper or intermediate portion of casing 57 is provided, at its rear edge, with an opening 75 therein, through which a part of a thermal switch 77 (see Fig. 1 of the drawings) may extend, in order to properly control the energization of a preferably electric heating means located within the oven.

Figure 2:
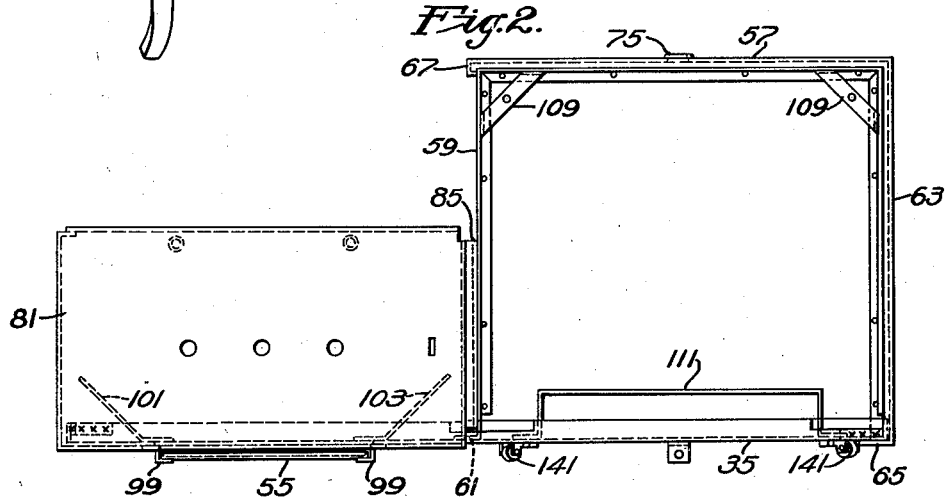
Fig. 2 is a view in front elevation of the oven and the stove casings in assembled positions on a base pan.

In assembling the range, flange 65 is located beneath the right-hand end of base pan 35, as will be seen more particularly by reference to Fig. 2 of the drawings, while the out-turned flange 61 on side 59 is adapted to rest upon the upper surface of base pan 35, at substantially its mid-portion, and to extend from front to rear thereof. In securing the oven casing in proper operative position, located as above described, on the base pan, I prefer to spot weld the flange 65 against the bottom of base pan 35, these welds being indicated by the numerals 79 in Fig. 3 of the drawings. Out-turned flange 61 may be welded, as by a plurality of spot welds 80 (see Fig. 3 of the drawings) to the top face or surface of base pan 35.

A stove casing 81 is shown in Figs. 8, 9 and 10 of the drawings, and it will be noted that this casing includes an intermediate portion 82, a rear portion 83 and a front portion 84, the fourth side being open and the top and bottom of the casing edges being located in horizontal planes, so that it may be described as an "incomplete" stove casing. The front side of stove casing 81 is provided with an in-turned end flange portion 85 while the rear side 83 is provided with an in-turned flange portion 87. Flange 85 is located in two parallel planes, as shown more particularly in Fig. 8 of the drawings, while flange portion 87 lies in a single plane only, the end portion of flange 85 and flange 87 lying in a single plane. The upper edges of the three portions 82, 83 and 84 are provided with a relatively narrow inner flange 89, while the bottom edges of these three walls are provided with a relatively wider flange 91, as will be seen more particularly by reference to Figs. 8 and 10 of the drawings.

Reference to Fig. 2 of the drawings will show that the oven casing 57 is so mounted on the base pan 35 that its open side rests thereon, and it will be further noted that the stove casing is so located on the base pan 35 that its open side, and more particularly the flanges 85 and 87, are adjacent to the side 59 of the oven casing. In other words, while the oven casing and the stove casing both comprise open casings having three sides only, the planes of these two casings extend at right angles to each other. I prefer, at present, to spot weld the flanges 85 and 87 against the wall 59, to thereby provide a relatively rigid assembly for the two casings, although any other suitable securing means may be utilized.

In order to further increase the rigidity of the structure, I may provide a plurality of spot welds between each of the flanges 91 at the bottom of the stove casing portions, and the bottom wall of the base pan 35, these spot welds being shown more particularly at 93 in Fig. 3 of the drawings.

Reference to Fig. 2 will show also that the stove casing and, particularly, the lower part thereof, surrounds the left-hand end of the base pan. This construction has the advantage that it obviates the necessity for a finish strip.

A plurality of legs 95 are provided, the upper ends of which are substantially flat and of substantially triangular shape and secured against the bottom of the base pan by a plurality of bolts extending through openings 97 therein (see Fig. 11 of the drawings). This permits of removing the legs, if desired, during shipment, in order to reduce the car space required by each range.

A pair of guides 99, each of substantially Z-shape in lateral section, have one side or portion thereof spot-welded to the base pan 35 immediately adjacent to the opening 53 therein, to slidably support the crumb tray 55 hereinbefore described. I provide, further, a pair of crumb shields 101 and 103, which may also be suitably spot-welded to the upper surface of base pan 35, adjacent to and at each side of opening 53, these plates extending upwardly and away from each other, as shown more particularly in Fig. 2 of the drawings, and it will be noted by reference to Fig. 3 of the drawings, that these plates extend only a portion of the entire depth from front to back of the range, since they do catch any crumbs or dirt or overflowing liquid caused by the use of the front heating elements 105 and 107, as shown in Fig. 1 of the drawings.

The oven casing 57 has secured therein at the forward end thereof, and in each one of the upper corners, an angularly extending bracket 109, each of which is provided with an opening therein. I provide further a bottom supporting bracket 111, of flat inverted U-shape and shown more particularly in Figs. 2 and 4 of the drawings, to support an oven lining 113, which is shown in section in Fig. 4 of the drawings.

The oven casing has operatively associated therewith a door frame 115, whose section is substantially that shown in Fig. 4 of the drawings, and which is generally of square or of rectangular shape. The door frame 115 is so designed as to include a lower laterally extending flange 117, which flange is adapted to be located below the base pan 35, and to be secured thereagainst by a plurality of machine screws 119, shown in Fig. 4 of the drawings.

The door frame 115 is provided, further, with an inner depressed portion 121, shown more particularly in Fig. 4 of the drawings, so that outwardly extending flanges 123, shown in Fig. 4 of the drawings, of the oven lining 113 may engage the same and be held in close operative engagement therewith by a plurality of clamping bolts 125, extending through the rear wall of oven lining 113 and also through a rear portion of the range assembly. The upper end of door frame 115 is secured against brackets 109 by short machine screws 127, so that the door frame is held in its proper operative position, relatively to the front edge portion of oven casing 57 by a plurality of screws 119 at the bottom and a plurality of screws 127 at the top.

A door 129 is hingedly mounted in any suitable or desired manner in the oven casing and I have shown a concealed hinge 131 pivoted on a pin 133 to support the door, (it being understood that two such hinges are used) and permit of an operator opening the same by a pivotally mounted handle 135 (see Fig. 1 of the drawings).

I may counter-balance the door 129 by a pair of extension springs 137, one end of each of which is suitably secured to a fixed member, not shown in the drawings, while the other end thereof is connected through a chain 139 moving over pulleys 141 to a part of the concealed hinge 131 in a manner well known in the art.

In order to reduce the heat loss from the oven lining 113, I may fill the space between the oven casing and the oven lining with heat insulating material 143, this material comprising, for instance, mineral wool, which is a good heat-insulating material. Both vertical walls of the oven lining 113 may be provided with a plurality of glides 145 to permit of locating thereon food trays, in a manner well known in the art, as well as an upper and a lower heating element, not shown in the drawings.

The rear end of the oven casing is closed by a rear cover or closure plate 147, shown more particularly in Fig. 7 of the drawings, and it will be noted that this plate is provided with a lower opening 149 and an upper opening 151 therein located near diagonally opposite corners, in order to permit of extending therethrough terminal members fixed in the oven assembly in a manner well known in the art, so that when a heating element is pushed into the oven lining 113, resting on, say, the uppermost glide 145, contact members thereon will operatively engage contact members or terminals extending into the oven assembly through opening 151. An additional opening 153 is provided, which may be utilized as desired, as a vent for the oven.

In assembling the oven portion 31 after the oven casing has been located, as hereinbefore described, on the base pan, and has been secured thereagainst, the door frame may be located in proper operative position and secured therein, after which the door and its set of hinges may be located in their proper operative positions and the counter-balancing means may also be located in cooperative relation therewith. The space between the oven lining 113 and casing 57, as well as the lowermost space between the oven lining and the base pan 35 may now be filled with the heat insulating material 143, after which the rear cover 147 may be located in place and secured therein by a plurality of small machine screws 155, shown more particularly in Fig. 4 of the drawings. It will be understood that the clamping bolts 125 were placed in proper operative position and extend through openings 157 in plate 147, these openings being shown in Fig. 7 of the drawings.

My improved range includes also an oven splasher plate 159, which plate is shown more particularly in Figs. 14 to 17, inclusive, from which it will be noted that it includes a rear laterally extending flange 161, an upper relatively short flange 163, and a front longitudinally extending flange portion 165, as well as a vertically extending bottom flange 167. Flange 161 is adapted to extend around behind the left-hand rear corner of the assembled oven structure, while flange 165 is adapted to fit inside of the left-hand side portion of door frame 115. The lower flange 167 is adapted to rest upon the upper ends of said portions 83 and 84 of the stove casing, and this flange may be provided with a plurality of openings 169, to receive securing screws whereby the splasher plate, and particularly its lower edge portion, may be secured against the side wall 59 of the oven casing. The depth of splasher plate 159 is such that its outer surface will line up or be flush with the outer surface of bead 67, so that bead 67 and the oven splasher plate will be located in substantially the same vertical plane.

I provide, also, a back splasher plate 171, which has a rearwardly extending lateral flange 173 on its upper and on its left-hand vertical edge, whereby the splasher plate will be relatively stiff or rigid. The right-hand edge portion is provided with a plurality of openings 175 which are adapted to register with a pair of openings 177 in flange 161, whereby both splasher plates may be secured against the outside of rear cover plate 147, openings 179 being provided therein to receive the securing screws or bolts. The bottom edge portion of plate 171 is provided with a plurality of openings 181 to receive securing screws whereby the lower edge may be secured against the top edge portion of side 83 of the stove casing.

After these parts have been located and secured, as hereinbefore described, a stove top plate 183, which includes, in addition to a flat horizontal portion, a front flange portion 185 and a side flange portion 187 may be located on the stove casing and be secured thereon in any suitable or desired manner.

The plate 183 may be provided with three openings for receiving the heating elements 105, 107, as well as a heating element 189, which heating elements may be controlled by a plurality of switches 191, which may be of the manually operable plural heat switch type in a manner well known in the art.

Reference has already been hereinbefore made to a thermal control switch for the heating means for the oven, and any desired design construction of such a switch may be utilized, and this heating element may also be controlled by a suitable toggle switch 193, mounted on and supported by the front wall 84 of the stove casing.

It will be noted that the range assembly embodying my invention comprises a minimum number of parts, which are so assembled and secured to each other as to provide a relatively rigid structure, without the use of relatively heavy skeleton frames. The various elements of the range assembly are so assembled that portions of one element either interlock with, or cover, portions of one or more of the other elements of the assembly, the final result being that no extra finish strips are required, while the entire range still has a pleasing appearance.

While I have thus far described one form of range embodying my invention, I do not desire to be limited thereto and reference may now be had to Figs. 21 to 23 inclusive which illustrate what may be called a "console" range, and it is to be noted that these figures of the drawings show only the parts more particularly embodying my invention.

An oven casing 201, of inverted U-shape and similar to oven casing 57, is located at the left-hand end of a base pan 203 which is similar to base pan 35. Oven casing 201 has an inturned flange 205 at the bottom edge of its left-hand side, and an outturned flange 207 at the bottom edge of its right-hand side. Flange 205 extends below base pan 203 and flange 207 rests on the upper surface of base pan 203, and both flanges may be secured to the engaging part of the base pan either by welds or bolts. The front edge of casing 201 is provided with a recess at its top and left-hand side to receive a door frame of the same kind as shown in Fig. 4 and designated by numeral 115, which door frame may be held in its proper operative position in the same manner as described in connection with Fig. 4. An oven lining may be used as was hereinbefore described.

A stove casing 209 comprising a front wall, a rear wall and one side wall has its open side located against the right-hand side wall of oven casing 201. A front flange 211 and a rear flange 213 are provided at the inner ends of the front and the rear wall of casing 209 and are secured against the right-hand side wall of the oven casing by spot welds or other suitable means. The side wall of the stove casing has an inturned flange 215 at its bottom edge, which flange extends below the base pan as is shown more particularly in Fig. 22 of the drawings. A stove cover plate (not shown in the drawings) is provided at the top of stove casing 209 and will be substantially the same as stove plate 183. Both the top and the bottom edges of the walls of the stove casing are provided with flanges 217 to permit of securing the associated parts in proper operative position. Any suitable supports, such as legs 95, may be provided beneath the base pan 203. The front wall of stove casing 209 is provided with a plurality of openings 219 for receiving the handles of plural-heat snap switches in a manner well known in the art.

Referring now to Figs. 24 to 26, I have there shown a still further modification of a device embodying my invention in the form of a "low oven" range only those parts being shown which are necessary for an understanding of the invention. An oven casing 221, of inverted U-shape, has its open lower end located adjacent to the upper surface of a base pan 223. The lower edges of the side walls are each provided with an inturned flange 225, which flanges are located beneath the base pan 223. The front edge of the casing 221 is shaped to provide a recess to receive a door frame (not shown). A back cover plate, an oven lining, a door and supports, will be provided but these parts will either be substantially the same as were hereinbefore described or constitute no part of my present invention.

A stove casing 227 comprises an open top-and-bottom member having four vertically-extending walls with an inturned top flange 229 and an inturned bottom flange 231. An overlapping end flange 233 permits of securing the adjacent ends of the stove casing together and I preferably locate this end flange at a rear corner. The bottom flanges 231 are adapted to rest on the top of oven casing 221 and may be secured thereto in any suitable manner, as by spot welds (not shown).

The front wall of the stove casing is provided with a cut out portion 235 at its lower edge so that a crumb tray (not shown) may be utilized sliding in a pair of guides 237, of substantially Z-shape in lateral section suitably secured to the top wall of casing 221.

A stove plate (not shown in the drawings) is to be provided at the top of stove casing 227 to receive and support heating elements. The front wall of stove casing 227 is provided with a plurality of holes 239 to receive plural-heat switches (not shown) in a manner well known in the art.

The various modifications illustrated and described show how my invention may be applied in various assemblies of ranges. Broadly stated my invention comprises the use of incomplete casings for an oven portion and for a stove portion secured together in a simple manner to obtain a relatively rigid but light construction which may be easily and quickly assembled.

Various other modifications may be made in the device embodying my invention without departing from the spirit and scope thereof, and I desire, therefore, that only such limitations shall be placed thereon as are imposed by the prior art or are set forth in the appended claims.

I claim as my invention:

1. A range assembly comprising a base pan, an oven casing having a pair of spaced side walls and a transverse wall extending between the upper ends of the side walls, the lower end of one side wall being secured to said base pan, the lower end of the other side wall having a flange and extending over one end edge of the base pan to cover said edge, said flange extending inwardly of and below said edge, a stove casing having a pair of spaced front and rear walls and a side wall extending between corresponding ends of the front and rear walls, said stove casing being secured to said base pan as a unit, the free ends of said last-named walls each terminating in a laterally extending flange portion, each flange portion being secured to a side wall of the oven casing.

2. A range assembly comprising a base pan, an oven casing having a pair of spaced side walls and a transverse top wall extending between the upper ends of the side walls, the lower end of one side wall being secured to said base pan, the lower end of the other side wall having an inwardly extending flange portion, said flange portion being secured to and below the base pan adjacent one end thereof, a stove casing having spaced front and rear walls and a side wall extending between the outer ends of the front and rear walls, the inner ends of said last-named walls being secured to one side wall of the oven casing, the lower ends of each wall of the stove casing having an inwardly extending flange portion, each last-named portion being secured to the lower face of the base pan whereby to cover side edges of said pan.

3. A range assembly comprising a base pan, edges of said pan terminating in an upwardly extending flange portion, an oven casing comprising side walls and a top wall extending between upper ends of the side walls, a stove casing having front and rear walls and an end wall extending between the outer ends of the front and rear walls, one side wall of the oven casing being secured to the upper face of the base pan, the lower end of the other side wall of the oven casing and the lower ends of the front and rear walls of the stove casing being provided with an inwardly extending flange portion, each flange portion being secured to the lower face of the base pan whereby each wall immediately adjacent a respective flange portion covers the adjacent flange in the base pan.

4. A range assembly comprising a base pan, edges of said pan terminating in a flange portion extending at substantially a right angle to the pan, an oven casing comprising integrally formed side walls and a top wall of U-shape, a stove casing comprising front and rear walls and an end wall forming integrally therewith and extending between the outer ends of said last-named walls, the inner ends of said last-named walls being secured to one side wall of the oven casing, the other side wall of the oven casing and the front, rear and end walls of the stove casing being positioned adjacent their lower ends to cover a respective flange portion of the base pan whereby to conceal said flange portions, and means to secure said last-named walls to said base pan.

ALFONS BARNSTEINER.